United States Patent [19]

Baldwin

[11] 4,348,001
[45] Sep. 7, 1982

[54] SHELF SUPPORT BRACKET

[75] Inventor: Mark H. Baldwin, Cincinnati, Ohio

[73] Assignee: NesTier Corporation, Cincinnati, Ohio

[21] Appl. No.: 189,197

[22] Filed: Sep. 22, 1980

[51] Int. Cl.³ .............................................. A47G 29/02
[52] U.S. Cl. ..................................... 248/243; 108/109; 211/187; 248/248; 403/187
[58] Field of Search ............... 248/247, 300, 301, 250, 248/225.2, 263, 243, 248; 211/151, 191, 192, 135, 87, 187, 190; 403/254, 253, 187, 262; 108/111, 107, 109

[56] References Cited

U.S. PATENT DOCUMENTS

| | | | |
|---|---|---|---|
| 2,026,223 | 12/1935 | Donnelly et al. | 211/135 X |
| 2,820,551 | 1/1958 | Mount | 108/107 |
| 3,081,717 | 3/1963 | Yurevich | 108/107 |
| 3,625,372 | 12/1971 | MacKenzie | 211/191 |
| 4,142,638 | 3/1979 | Vareo | 211/187 |

FOREIGN PATENT DOCUMENTS 633867  1/1962  Canada ................................. 211/191

Primary Examiner—Ramon S. Britts
Assistant Examiner—Ramon O. Ramirez
Attorney, Agent, or Firm—John R. Mattingly

[57] ABSTRACT

A shelf mounting bracket includes a flat rectangular plate having top and bottom edges and opposite side edges. Vertically-spaced mounting hooks are bent from the plate. Flanges are bent from the opposite side edges of the plate in the same direction as the mounting hooks, and the bottom end portions of the flanges are formed with shelf support hooks facing in an opposite direction from the bracket mounting hooks. The mounting hooks are adapted to be received in vertically-spaced holes in columns of a storage rack.

10 Claims, 4 Drawing Figures

SHELF SUPPORT BRACKET

BACKGROUND OF THE INVENTION

This application relates to the art of brackets and, more particularly, to brackets for mounting shelves on vertical columns. The invention is particularly applicable for use in mounting shelves on a gravity flow rack of an order picking system. However, it will be appreciated that the bracket may be used for other shelves.

There are many different manufacturers of metal framing which can be assembled into pallet storage racks. In such racks, the frame members which support the pallets are positioned horizontally, and there is no way for supporting downwardly inclined shelves so that the rack can be used for an order picking system. It would be desirable to have shelf support brackets capable of use with different metal framing for supporting downwardly inclined shelves.

SUMMARY OF THE INVENTION

A shelf support bracket includes a generally rectangular flat plate having top and bottom edges and opposite side edges. A first bracket mounting hook is bent from the top edge of the plate and is located centrally between the plate side edges. A second mounting hook is located intermediate the plate top and bottom edges, and is also located centrally between the plate side edges. The mounting hooks open toward the plate bottom edge.

Opposite flanges project from the plate side edges in the same direction as the mounting hooks. The bottom end portions of the flanges adjacent the plate bottom edge are formed with shelf support hooks which open toward the plate top edge. The flanges extend generally perpendicular to the plate and the saddles of the shelf support hooks have axes extending generally perpendicular to the plate.

The plate has a generally rectangular notch therein extending upwardly from the plate bottom edge centrally between the plate side edges. The notch has a length and width greater than the length and width of the first mounting hook.

Each flange has a length less than the length of a plate side edge. The top edge of each flange is spaced from the plate top edge and the shelf mounting hooks are also spaced from the plate bottom edge.

The shelf support hooks are located intermediate the second mounting hook and the plate bottom edge. The second mounting hook is located substantially closer to the plate bottom edge than to the plate top edge.

The mounting hooks are spaced a predetermined distance outwardly from one face of the plate and the flanges have a width substantially greater than the predetermined distance.

It is a principal object of the present invention to provide an improved shelf mounting bracket.

It is also an object of the invention to provide a shelf mounting bracket which is economical to manufacture and very simple to install.

DESCRIPTION OF A PREFERRED EMBODIMENT

Figure 1:
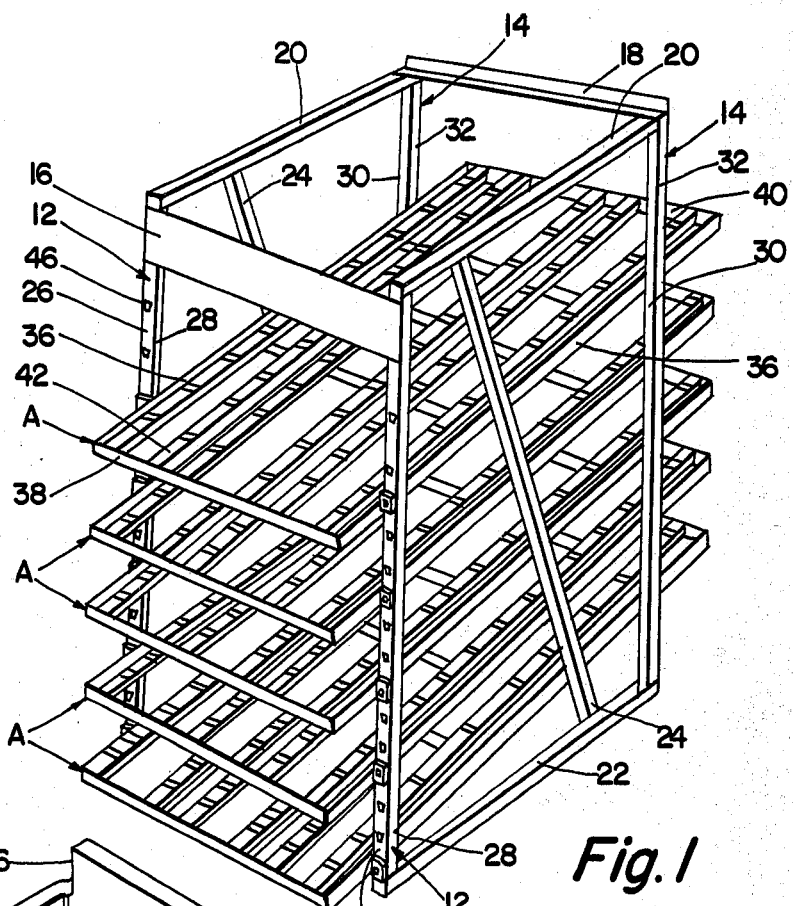
FIG. 1 is a diagrammatic perspective illustration of a gravity flow rack used in an order picking system.
Figure 2:
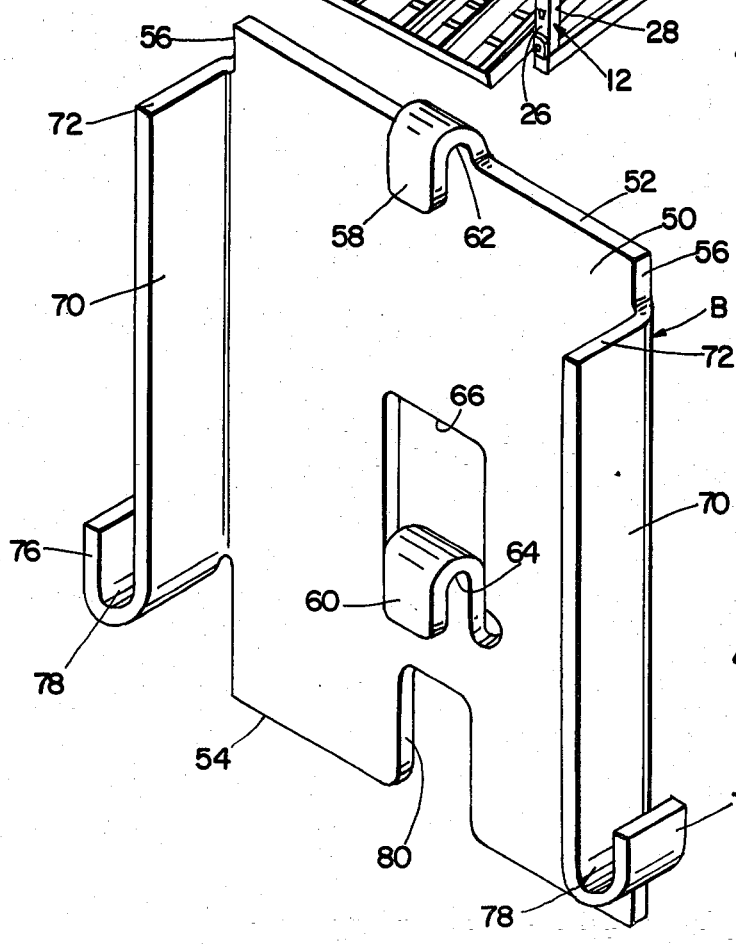
FIG. 2 is a perspective illustration of the improved shelf support bracket of the present application.

With reference to the drawing, FIG. 1 shows a gravity flow rack including a generally cubical frame assembly having spaced-apart vertical front columns 12 and spaced-apart vertical rear columns 14. Front upper connecting member 16 extends between the upper end portions of front columns 12, and rear upper connecting member 18 extends between the upper end portions of rear columns 14. Upper side connecting members 20 and bottom connecting members 22 extend between front columns 12 and rear columns 14. Diagonal frame members 24 extend between upper and bottom side connecting members 20, 22.

Columns 12, 14 are tubular and of rectangular cross-sectional configuration. Each front column 12 has a front face 26 and parallel opposite side faces 28 extending perpendicular to front face 26. Each rear column 14 has a front face 30 and opposite parallel side faces 32 extending generally perpendicular to front face 30. A plurality of vertically-spaced shelves A are supported on columns 12, 14 and are downwardly inclined in a direction from rear columns 14 toward front columns 12. Each shelf A includes a generally rectangular peripheral shelf frame having parallel opposite side shelf frame members 36, and front and rear rails 38, 40. A plurality of elongated track members 42 extend between front and rear rails 38, 40 for supporting merchandise cartons. When cartons are positioned on track members 42 adjacent rear columns 14, the cartons slide on the track members toward front rail 38.

Figure 3:
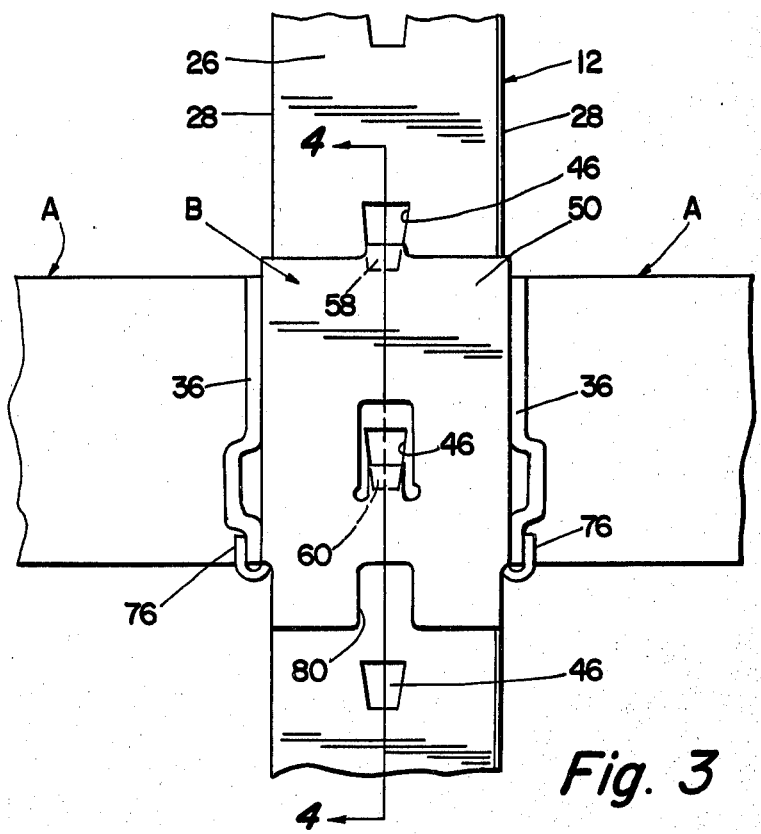
FIG. 3 is a front elevational view showing the shelf support bracket mounted on a vertical column, and with shelf side frame members supported by the brackets.
Figure 4:
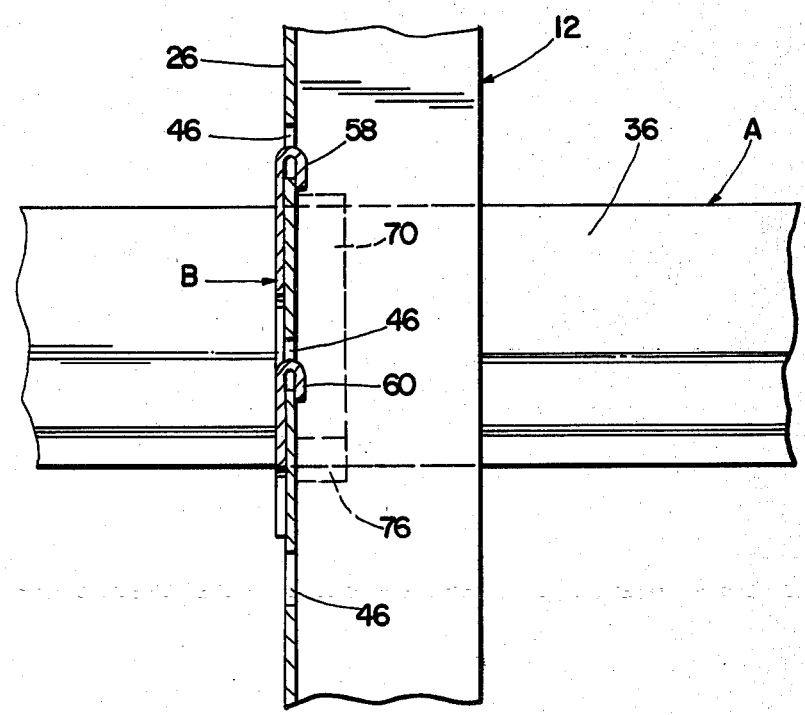
FIG. 4 is a partial cross-sectional elevational view taken generally on line 4—4 of FIG. 3.

At least front faces 26, 30 of columns 12, 14 have a plurality of vertically-spaced holes therein and such holes in front face 26 of a front column 12 are indicated at 46 in FIGS. 3 and 4.

Metal shelf mounting bracket B includes a generally flat rectangular plate 50 having parallel top and bottom edges 52, 54 and opposite side edges 56.

First and second bracket mounting hooks 58, 60 are bent from plate 50. First mounting hook 58 is located centrally between opposite side edges 56 and is bent from top edge 52. First hook 58 opens downwardly toward plate bottom edge 54 and its saddle portion 62 is actually located slightly above plate top edge 52 and has an axis extending parallel to plate 50.

Second bracket mounting hook 60 is bent from plate 50 in the same direction as first mounting hook 58. Second mounting hook 60 opens downwardly toward plate bottom edge 54 and is also located centrally between opposite plate side edges 56. Second mounting hook saddle portion 64 is located substantially closer to plate bottom edge 54 than to plate top edge 52 and has a saddle axis extending generally parallel to plate 50. Punching and bending of second mounting hook 60 leaves a generally rectangular opening 66 in plate 50.

Opposite flanges 70 extend from opposite plate side edges 56 in the same direction as first and second mounting hooks 58, 60. Flanges 70 extend generally perpendicular to plate 50 and have top flange ends 72 spaced downwardly from plate top edge 52. Each flange 70 has a length which is less than the length of a side edge 56 between top and bottom edges 52, 54 and the length of each flange 70 is also substantially greater than one-half the length of a side edge 56. The bottom end portions of flanges 70 are provided with shelf support hooks 76 which open upwardly toward plate top edge 52. Shelf support hooks 76 have hook saddle portions 78 which are located intermediate plate bottom edge 54 and second mounting hook saddle portion 64. The axes of saddle portions 78 on shelf support hooks 76 extend generally perpendicular to plate 50. First and second mounting hooks 58, 60 extend a predetermined distance outwardly from one face of plate 50 and flanges 70 have a width substantially greater than that predetermined distance.

Plate 50 has a generally rectangular notch 80 extending upwardly from plate bottom edge 54 centrally between opposite plate side edges 56. Notch 80 has a height and width which is greater than the height and width of first mounting hook 58 prior to bending thereof into its hook configuration. This allows a plurality of brackets B to be formed in a continuous strip of metal without any waste because notch 80 in one bracket leaves a tongue on the next succeeding bracket to form first mounting hook 58. Likewise, spacing of flange top end 72 from plate top edge 52 provides extra metal at the bottom end portions of flanges 70 to form shelf support hooks 76.

The width of each column 12, 14 between its opposite side faces 28, 32 is approximately the same as the distance between opposite bracket flanges 70. Bracket B is mounted on a column by placing mounting hooks 58, 60 in a pair of holes 46 until plate 50 bears against front face 26 as shown in FIG. 3. Bracket B is then moved downwardly until the saddle portions of first mounting hooks 58, 60 rest on the bottom edges of holes 46. The distance between the saddle portions of first mounting hooks 58, 60 is approximately the same as the spacing between the bottoms of a pair of holes 46. Flanges 70 extend closely along opposite column side faces 28 for stabilizing bracket B against twisting or displacement from its mounted position. Shelf support hooks 76 are located on column side faces 28 closely adjacent front face 26 thereof and supportingly receive the bottom edges of shelf side frame members 36 as shown in FIG. 3. The brackets on front columns 12 are placed at a lower elevation than the brackets on rear columns 14 for each shelf A so that the shelves will slope downwardly from rear to front.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A shelf hanger bracket comprising: a substantially flat rectangular plate having plate top and plate bottom edges and opposite side edges, a first mounting hook bent from said plate top edge and extending back toward said plate bottom edge, said first mounting hook being located substantially centrally between said side edges, a second mounting hook bent from said plate intermediate said plate top and said plate bottom edges in the same direction as said first mounting hook and being located substantially centrally between said side edges, flanges bent from said side edges, extending out from said plate in the same direction as said first and said second mounting hooks and further extending substantially perpendicular to said plate, said flanges having shelf support hooks adjacent said plate bottom edge, said shelf support hooks having saddles facing upwardly toward said plate top edge and having saddle axes extending substantially perpendicular to said plate.

2. The bracket of claim 1 wherein said plate has a generally rectangular notch therein extending upwardly from said plate bottom edge, said notch being located centrally between said plate side edges and having a length and width greater than the length and width of said first mounting hook.

3. The bracket of claim 1 wherein said flanges have a length which is less than the length of said side edges and substantially greater than one-half the length of said side edges.

4. The bracket of claim 1 wherein said flanges have top flange ends spaced downwardly from said plate top edge, and said shelf support hooks being spaced above said plate bottom edge.

5. The bracket of claim 1 wherein said first and said second mounting hooks are spaced a predetermined distance outwardly from one face of said plate and said flanges have a width which is substantially greater than said predetermined distance.

6. The bracket of claim 1 wherein said shelf support hooks are spaced toward said plate bottom edge from said second mounting hook.

7. The bracket of claim 1 wherein said second mounting hook is closer to said plate bottom edge than to said plate top edge.

8. The bracket of claim 1 wherein said flanges have top flange ends spaced downwardly from said plate top edge, said shelf support hooks being located intermediate said second mounting hook and said plate bottom edge, said first and said second mounting hooks being spaced a predetermined distance outwardly from one face of said plate, said flanges having a width substantially greater than said predetermined distance, said second mounting hook being closer to said plate bottom edge than to said plate top edge, said plate having a generally rectangular notch therein extending upwardly from said plate bottom edge, said notch being located centrally between said side edges and having a length and width greater than the length and width of said first mounting hook.

9. A rack including the bracket of claim 1, further including spaced pairs of front and rear vertical columns, each of said columns having a rectangular cross-sectional shape and front and side faces, each of said columns having a width across said column front faces approximately the same as the distance between said flanges, said column front faces having vertically spaced holes therein; brackets on each of said columns with said first and said second bracket mounting hooks received in said vertically spaced holes and with said plates lying against said column front faces and said flanges extending along said column side faces.

10. The rack according to claim 9, further including shelves extending between said columns, said shelves having shelf side frame members adapted to be supported on said shelf support hooks.

* * * * *